3,454,582
XANTHENE-9-OL-9-CARBOXYLIC ACID ESTERS
Kurt Stach and Werner Winter, Mannheim, Wolfgang Schaumann, Mannheim-Waldhof, and Annemarie Ribbentrop, Mannheim, Germany, assignors to C. F. Boehringer & Soehne GmbH, Mannheim-Waldhof, Germany, a corporation of Germany
No Drawing. Filed Oct. 20, 1965, Ser. No. 499,021
Claims priority, application Germany, Dec. 10, 1964,
B 79,683
Int. Cl. C07d 99/04, 43/18, 43/06
U.S. Cl. 260—294.3                      7 Claims

ABSTRACT OF THE DISCLOSURE

Xanthene-9-ol-9-carboxylic acid esters constituting effective therapeutic agents for the treatment of disorders of the central nervous system and being particularly useful as tranquilizing, antichlorinergic, and anti-Parkinsonism agents characterized by the following structural formula:

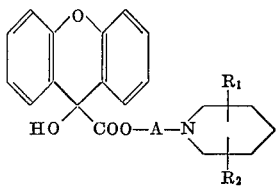

and the non-toxic salts thereof wherein $R_1$ and $R_2$ are each hydrogen, alkyl, acyl or alkoxy and when taken together form an alkylene bridge and A is alkylene.

---

The present invention relates to a new class of organic compounds and more particularly to the xanthene-9-ol-9-carboxylic acid esters of the following structural formula:

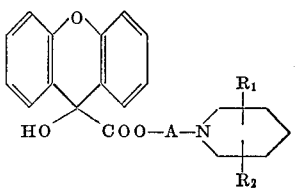

and the salts thereof, wherein $R_1$ and $R_2$ each represents one of hydrogen, alkyl, acyl or alkoxy radicals or when taken together $R_1$ and $R_2$ form an alkylene bridge and A is a lower straight-chain or branched alkylene radical.

The new esters are effective therapeutic agents for the treatment of disorders of the central nervous system. More specifically, these novel compounds have utility as tranquilizers, anticholinergics and anti-Parkinsonism drugs. In particular, they may be used as premedication by the anaesthesiologist. They may be used in the form of the free bases, but preferably are used as acid addition or quaternary ammonium salts.

In British Patent No. 680,925 and U.S. Patent No. 2,776,299, there is described a basic-substituted xanthene-9-ol-9-carboxylic acid ester, and namely, the β-diethylaminoethyl ester, which is formed as an intermediate in the preparation of the corresponding methobromide. The compound disclosed in the aforesaid patents is described as possessing a surface-active effect and being suitable for use as an antiseptic and dispersion agent, sympatholytic, spasmolytic, anticholinergic and ganglion blocking agent.

In accordance with the invention, it has now been found that the new compounds having the above structural formula, in comparison with the above-mentioned intermediate, i.e., the β-diethylaminoethyl ester of xanthene-9-ol-9-carboxylic acid, possess a considerably better and longer lasting central anticholinergic effect.

The effect of anti-cholinergics on the central nervous system is utilized in the treatment of Parkinson's disease and in their application as tranquilizing agents, as for example is scopolamine for the induction of narcosis. The therapeutic application of their central effect is often hampered by peripheral effects, such as, for example, dryness of the mouth and accommodation difficulties. The development of anticholinergics of high central effectiveness having as few peripheral effects as possible (i.e., high central specificity) is, therefore, or great importance. Surprisingly, the compounds of the invention, i.e., the xanthene-9-ol-9-carboxylic acid esters exhibit markedly outstanding central anti-cholinergic properties in comparison with the known β-diethylaminoethyl ester compounds, and at the same time are possessed of a more favorable therapeutic index.

The new compounds according to the present invention having the structural Formula I can be prepared, by various synthetic routes. Included among these are the following:

(a) Reacting an alcohol having the formula:

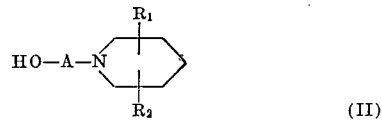

wherein A, $R_1$ and $R_2$ are as above defined or a reactive ester thereof, with xanthene-9-ol-9-carboxylic acid or a reactive derivative thereof, the 9-hydroxy group optionally having been previously blocked in the conventional manner, (b) Reacting a piperidine having the formula:

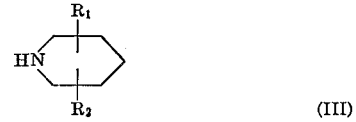

wherein $R_1$ and $R_2$ are as above defined, with a xanthene-9-ol-9-carboxylic acid ester of the formula:

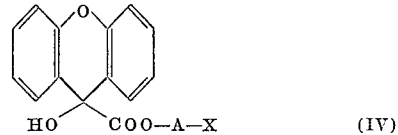

wherein A is as above defined and X is a reactive ester group, (c) Reacting a haloformic acid ester of the formula:

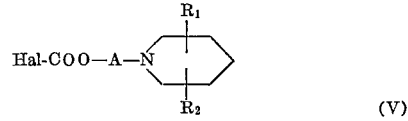

wherein A, $R_1$ and $R_2$ are as above defined and Hal is a halogen atom, with an alkali metal adduct of xanthone.

In carrying out the preparation of the new compounds according to method (a), there can be used all of the conventional methods of esterification. Insofar as the free 9-hydroxyl group thereby undergoes undesirable side reactions, it must previously be blocked in the usual manner, as, for example, by acylation (formylation) or etherification (benzylation or reaction with dihydropyran). Illustrative of a preferred embodiment of this type of reaction is the reaction of xanthene-9-ol-9-carboxylic acid or a salt thereof with a reactive ester of an alcohol of the Formula II and preferably the hydrohalic acid ester of said alcohol. The reaction is advantageously carried out in a suitable solvent, such as isopropanol. Alternatively, a free alcohol of Formula II can be reacted in the conventional manner with a reactive derivative of xanthene-9-ol-9-carboxylic acid.

The reaction of a piperidine having the Formula III, according to method (b), with a xanthene-9-ol-9-carboxylic acid ester of the Formula IV takes place under the usual conditions observed for the N-alkylation of piperidines, for example, by heating in an inert solvent, preferably in the presence of an acid-binding agent, such as a base.

The preparation of the novel compounds of the invention having the Formula I by method (c) is carried out in the usual way by reacting an alkali metal adduct of xanthone with a haloformic acid ester of Formula V and subsequently hydrolyzing the reaction product with a suitable aqueous solvent.

The new compounds according to the present invention can be converted into their salts, such as the hydrochlorides, in the usual manner by reaction with organic or inorganic acids.

As noted above, the novel esters may be used in the form of the free bases, but preferably are used as acid addition or quaternary ammonium salts. The bases of the invention form salts with a variety of inorganic and strong organic acids including maleic, fumaric, benzoic, ascorbic, pamoic, succinic, bis-methylenesalicyclic, methane sulfonic, acetic, propionic, tartaric, salicyclic, citric, lactic, malic, mandelic, stearic, palmitic, glutamic, and hydrochloric, hydrobromic, sulfuric, sulfonic, phosphoric, and nitric acids. Such salts are easily prepared by the methods known to the art. The bases react with either the calculated amount of organic or inorganic acid in aqueous miscible solvents, such as acetone, or ethanol with isolation of the salt by concentration and cooling or an excess of the acid in aqueous immiscible solvent, such as ethyl ether or chloroform, with the desired salt separating directly. Of course, the salts may also be prepared by the classical method of double decomposition of appropriate salts which is well known to the art. The esters of the foregoing type also form quaternary ammonium salts with a variety of organic esters. Among such esters are methylchloride and bromide, ethylchloride, propylchloride, butylchloride, isobutylchloride, benzylchloride, and bromide, ethylbromide, naphthylmethylchloride, dimethylsulfate, diethylsulfate, methylbenzenesulfate, ethyltoluenesulfate, and ethylenechlorohydrin. The alkylhalide quaternary salts are suitably prepared by treating the base in an anhydrous solvent medium with an excess of the alkylhalide and recrystallizing the product from the ethanol.

A prepared salt which is non-toxic at the therapeutic dosage level and non-hygroscopic is the hydrohalide and preferably the hydrochloride.

The following examples are given for the purpose of illustrating the present invention and are not to be construed as a limitation thereof.

EXAMPLE 1

Xanthene-9-ol-9-carboxylic acid-[2-(N-piperidino)-ethyl] ester 12.1 g. (0.05 mol) xanthene-9-ol-9-carboxylic acid and 7.4 g. (0.05 mol) N-(2-chloroethyl)-piperidine were heated to boiling for 8 hours in 75 ml. isopropanol. The small amount of impurities which were present were then filtered off, the filtrate considerably evaporated and the residue taken up in 75 ml. water, extracted with ether and the aqueous phase rendered alkaline with a solution of sodium carbonate. The base which was thereby separated out was extracted with ether. The organic phase was dried with anhydrous sodium sulfate and evaporated. There were obtained 12.3 g. (70% of theory) xanthene-9-ol-9-carboxylic acid-[2-(N-piperidino)-ethyl] ester in the form of a yellow oil. The hydrochloride prepared therefrom in the usual manner melts, following recrystallization from isopropanol, at 197–198° C.

EXAMPLE 2

Xanthene-9-ol-9-carboxylic acid-[3-(N-piperidino)-propyl]-ester 9.6 g. (0.04 mol) xanthene-9-ol-9-carboxylic acid and 7.1 g. N-(3-chloropropyl)-piperidine (0.044 mol) were heated to boiling for 7 hours in 75 ml. isopropanol. The reaction mixture was thereafter worked up in the manner described in Example 1. There were recovered 9.8 g. (67% of theory) xanthene-9-ol-9-carboxylic acid-[3-(N-piperidino)-propyl] ester as a yellow oil which, after standing for some time, solidified. Following recrystallization from petroleum ether (B.P. 100–140° C.), the xanthene-9-ol-9-carboxylic acid-[3-(N-piperidino)-propyl]-ester had a melting point of 124–126° C.

EXAMPLE 3

Xanthene-9-ol-9-carboxylic acid-[2-(N-norgranatanyl)-ethyl] ester 12.1 g. (0.05 mol) xanthene-9-ol-9-carboxylic acid and 9.4 g. (0.05 mol) N-(2-chloroethyl)-norgranatane were heated to boiling for 8 hours in 75 ml. isopropanol. After cooling the reaction mixture to room temperature, the separated xanthene-9-ol-9-carboxylic acid-[2-(N-norgranatanyl)-ethyl]ester hydrochloride was filtered off using suction. The hydrochloride was converted into the corresponding free base by treatment thereof with a solution of sodium carbonate. After trituration with petroleum ether, this free base melted at 93–95° C. The isopropanol mother liquor was worked up in the manner described in Example 1, with the result that further amounts of base could be isolated which could be converted into the hydrochloride in the usual manner in ethereal solution. The total yield of xanthene-9-ol-9-carboxylic acid-[2-N-norgranatanyl)-ethyl] ester hydrochloride amounted to 12.5 g. (58% of theory). The hydrochloride had a melting point of 230–231° C. The free base was converted in the usual manner into the maleate (M.P. 112° C.) and the hydrobromide (M.P. 224–225° C.).

EXAMPLE 4

Xanthene - 9 - ol - 9 - carboxylic acid - [2 - (4 - methoxypiperidino-1)-ethyl] ester 12.1 g. (0.05 mol) xanthene-9-ol-9-carboxylic acid were dissolved in 125 ml. isopropanol and in solution reacted with 9.75 g. (0.055 mol) 1-(4-methoxy-piperidino-1)-2-chloroethane. The reaction mixture was then heated under reflux for 7 hours and worked up in the manner described in Example 1. There were obtained 13.8 g. (72.1% of theory) of xanthene-9-ol-9-carboxylic acid-[2-(4-methoxypiperidino-1)-ethyl] ester which was converted into the hydrochloride by treatment with ethereal hydrochloric acid. After recrystallizing once from isopropanol, the salt melted at 196–197° C. (decomp.).

EXAMPLE 5

Xanthene-9-ol-9-carboxylic acid-[2-(4-methyl-piperidino-1)-ethyl] ester 9.6 g. (0.04 mol) xanthene-9-ol-9-carboxylic acid were reacted with 7.1 g. (0.044 mol) 1-(4-methylpiperidino-1)-2-chloroethane in 100 ml. isopropanol in the manner described in Example 1 and the reaction mixture thereby obtained worked up in an analogous manner. There were recovered 9.85 g. (67% of theory) xanthene-9-ol-9-carboxylic acid-[2-(4-methyl-piperidino-1)ethyl] ester which, following recrystallization from petroleum ether (B.P. 100–140° C.), melted at 124–126° C.

EXAMPLE 6

Xanthene-9-ol-9-carboxylic acid-[2-(N-nortropanyl)-ethyl]-ester 8.4 g. (0.04 mol) 2-(N-nortropanyl)-ethyl chloride hydrochloride were introduced into 100 ml. of an isopropanol solution of 1.6 g. (0.04 mol) sodium hydroxide. Following the addition of 9.6 g. xanthene-9-ol-9-carboxylic acid (0.04 mol), the reaction mixture was heated to boiling for 7 hours. The reaction mixture was then worked up in a manner analogous to that described in Example 1. There were obtained 8.5 g. (56% of theory) xanthene-9-ol-9-carboxylic acid-[2-(N-nortropanyl)-ethyl]ester. An ethereal solution of this ester was treated with hydrogen chloride, to produce the corresponding hydrochloride which, after recrystallization from alcohol, melted at 225–227° C.

EXPERIMENTAL DATA

The peripheral anti-cholinergic effectiveness of the xanthene-9-ol-9-carboxylic acid esters in accordance with the invention was determined on the basis of the mydriasis of the mouse (P. Pulewka, Arch. Exp. Path. u. Pharmacol., 168, 307/1932) and by means of the chromodacryorrhea test (A. Burgen, Brit. J. Pharmacol., 4, 85 1947) on the rat.

The evaluation of central anticholinergic effectiveness was on the basis of the following test methods:

(a) Mintacol toxicity test

The peripheral effectiveness of "Mintacol" (diethylphosphoric acid-p-nitrophenolester, paraoxon), a cholinesterase inhibitor, is hampered by PAM (pyridine-2-aldoximine-1-methyliodide). Death caused by Mintacol after previous treatment with PAM is accordingly due to a central cholinergic effect and can be avoided by administration of centrally effective anticholinergics (cf. W. Schaumann, Arch. Exp. Path. u. Pharmacol., 239, 96/1960).

The animals (mice) received an absolutely lethal dose of Mintacol with a simultaneous dose of PAM. The substances to be tested were administered subcutaneously 15 minutes prior to the administration of the Mintacol and PAM, and the dose which serves to reduce the central toxicity of Mintacol to 50% was taken as the $ED_{50}$.

(b) Inhibition of catatonia induced by Dartal

Dartal (2 - chlor - 10 - [gamma - {4 - (betaacetoxyethyl) - piperazinyl} - propyl] - phenothiazine (thiopropazate) causes a "flexibilitas cerea" (catatonia) in the rat which can be eliminated by centrally active anticholinergic agents (cf. W. Schaumann and H. G. Kurbjuweit, "Arzneimittel-Forschung," 11, 343/1961, and M. Taschler et al., "Psychiatria et Neurologia," 139, 85/1960). The experimental animals (rats) first received Dartal, and the dose of the test substance which prevents the occurrence of catatonia in half of the animals was determined.

The following compounds were utilized in the tests:

A. Xanthene - 9 - ol - 9 - carboxylic acid - [2 - (N-piperidine)-ethyl]-ester.

B. Xanthene - 9 - ol - 9 - carboxylic acid - [2 - (N-norgranatanyl)-ethyl]-ester.

C. Xanthene - 9 - ol - 9 - carboxylic acid - (β-diethylaminoethyl)-ester. (U.S. Pat. No. 2,776,299.)

The results of the comparative tests are set out in the following table:

| Test | A | B | C |
|---|---|---|---|
| Mydriasis, 30 min | 11.0 | 1.7 | 1.9 |
| $ED_{50}$, mg./kg., mouse s.c., 120 min | 23 | | 14.5 |
| Half value time, min | 144 | | 32 |
| Antimintacol., 30 min | 1.0 | 0.14 | 0.3 |
| Tox. $ED_{50}$, mg./kg. s.c. mouse, 120 min | 0.5 | | 5.8 |
| Half value time, min | >240 | | 50 |
| Central specificity, mouse | 22 | 12 | 6.3 |
| Chromdacr. 30 min. $ED_{50}$, mg./kg. s.c. rat | 2.7 | 2.5 | 1.4 |
| Inhibition of Dartal induced catatonia, mg./kg./s.c. rat., 30 min | 2.1 | 1.9 | 6.4 |
| Central specificity rat | 1.3 | 1.3 | 0.2 |

As can be seen from the table compounds xanthene-9-ol-9-carboxylic acid-[2-(N-piperidine)-ethyl]ester and xanthene - 9 - ol - 9 - carboxylic acid - [2 - (N-norgranatanyl)-ethyl]-ester have a better central specificity (quotient obtained by dividing the peripheral by central activity) in both the test animals than that of the known compound xanthene-9-ol-9-carboxylic acid - β - diethylaminoethyl)-ester. The duration of effect of xanthene-9-ol-9-carboxylic acid-[2-(N-piperidino)-ethyl]-ester is also longer than that of the known compound xanthene-9-ol-9-carboxylic acid-(β-diethylaminoethyl)-ester.

The end products of this invention may be combined with a pharmaceutical carrier for administartion to humans in an amount to obtain the desired central anticholinergic effect. Such carriers are either solid or liquid. Exemplary of solid pharmaceutical carriers are: lactose, corn starch, mannitol, talc, etc. The compounds of this invention are mixed with the carrier and built into hard gelatin capsules or tableted with suitable tableting aids, such as magnesium stearate, starch, or other lubricants, disintegrants, or coloring agents. This combination may be with a liquid carrier if desired, in which event a soft gelatin capsule is filled with a slurry of the novel compound in soy bean or peanut oil. Aqueous suspensions of solutions are prepared for alternate oral or parenteral administration.

We claim:

1. A compound selected from the group consisting of xanthene-9-ol-9-carboxylic acid esters of the formula:

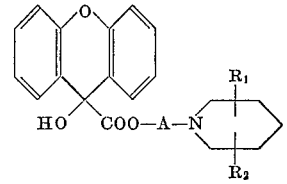

wherein $R_1$ is hydrogen and $R_2$ is a member selected from the group consisting of hydrogen, methyl and methoxy wherein $R_1$ and $R_2$ when taken together with the piperidine represent norgranatanyl or nortropanyl and A is alkylene containing 2 to 3 carbon atoms and the non-toxic salts thereof.

2. Xanthene-9-ol-9-carboxylic acid-[2-(N-piperidino)-ethyl] ester.

3. Xanthene-9-ol-9-carboxylic acid-[3-(N-piperidino)-propyl] ester.

4. Xanthene-9-ol-9-carboxylic acid-[2-(N-norgrantanyl)-ethyl] ester.

5. Xanthene-9-ol-9-carboxylic acid-[2-(4-methoxypiperidino-1)-ethyl] ester.

6. Xanthene-9-ol-9-carboxylic acid-[2-(4-methylpiperidino-1)ethyl] ester.

7. Xanthene-9-ol-9-carboxylic acid-[2-(N-nortropanyl)-ethyl] ester.

References Cited

UNITED STATES PATENTS

| | | | |
|---|---|---|---|
| 2,659,725 | 11/1953 | Cusic et al. | 260—294.3 |
| 2,776,299 | 1/1957 | Cusic et al. | 260—335 |
| 2,887,409 | 5/1959 | Van Loo | 260—249.9 XR |
| 2,937,172 | 5/1960 | Shapiro | 260—249.9 |

JOHN D. RANDOLPH, Primary Examiner.

ALAN L. ROTMAN, Assistant Examiner.

U.S. Cl. X.R.

260—292, 335, 999